July 3, 1962     H. R. HALL     3,041,960
COFFEE MAKING APPARATUS
Filed March 5, 1959     3 Sheets-Sheet 1
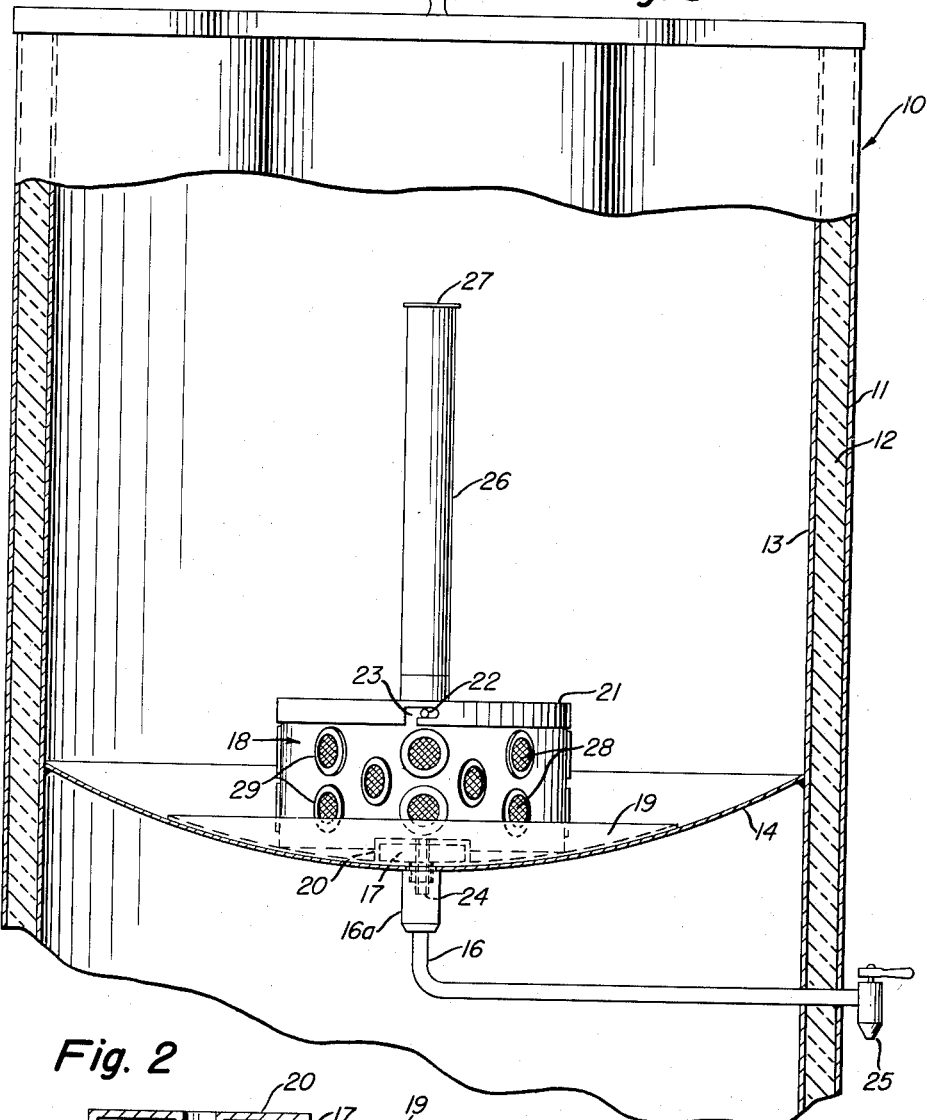
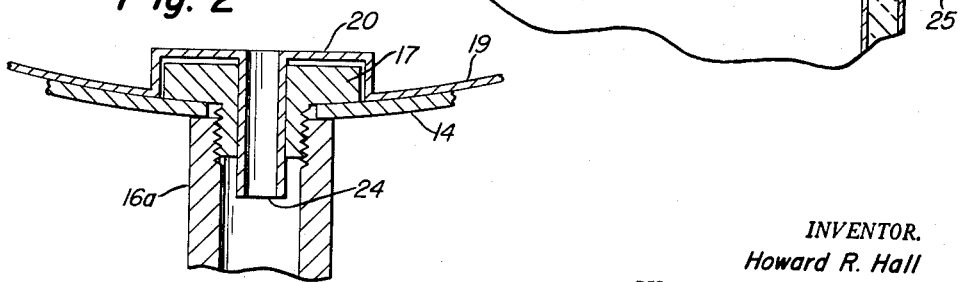
INVENTOR.
Howard R. Hall
BY
Merriam, Lorch & Smith
ATTORNEYS July 3, 1962     H. R. HALL     3,041,960
COFFEE MAKING APPARATUS Filed March 5, 1959     3 Sheets-Sheet 2

INVENTOR.
Howard R. Hall
BY
Merriam, Lorch & Smith
ATTORNEYS

July 3, 1962     H. R. HALL     3,041,960
COFFEE MAKING APPARATUS

Filed March 5, 1959     3 Sheets-Sheet 3

INVENTOR.
Howard R. Hall
BY
Merriam, Lorch & Smith
ATTORNEYS

United States Patent Office 3,041,960
Patented July 3, 1962

3,041,960
COFFEE MAKING APPARATUS
Howard R. Hall, 729 Washington Ave., Wilmette, Ill.
Filed Mar. 5, 1959, Ser. No. 797,424
4 Claims. (Cl. 99—316)

This invention relates to coffee making apparatus and more particularly it pertains to an extractor designed to be used with coffee urns of the type found in hotels, restaurants and the like which permits the use of finely divided or pulverized coffee, with a consequent increase in the yield of brewed coffee.

The coffee making apparatus with which the device of the invention is intended to be used is the coffee urn commonly used by hotels and restaurants for brewing coffee in large amounts. A typical coffee urn consists of a suitable metal outer container having a liner of glass, stainless steel, porcelain, or china. The urn is equipped with a suitable cover as well as a valve for drawing off the brewed coffee. In making coffee with such an urn, the ground coffee is placed in a cloth bag which is suspended in the interior of the coffee urn. Hot water is then poured through the bag containing the coffee grounds, the cloth serving as a filter for removing the solid particles of coffee from the finished brew.

As is well known, the speed and degree of completeness of the extraction of the desirable soluble values from ground coffee depend to a large extent on the fineness of the coffee grind. In order to obtain the maximum yield of brewed coffee from a given quantity of coffee beans it is desirable to have the coffee ground as finely as possible consistent with the ability of the coffee making apparatus to produce coffee of acceptable quality therefrom.

In the restaurant-type coffee urns described above, coffee of a moderate degree of fineness is commonly employed. In order to obtain reasonably complete removal of the soluble coffee values, the brewed coffee is commonly passed at least twice through the grounds. Even so, however, the extraction is far from complete and the discarded grounds still contain considerable potential coffee making ability.

Attempts to increase the yield of coffee in this type of urn by the use of extremely finely ground or pulverized coffee have heretofore met with failure. Any bag, whether of cloth or metal, having pores sufficiently fine to contain the ground coffee is soon plugged by the coffee under the weight of the hot water within the bag.

The device of this invention permits the use of pulverized coffee in brewing coffee in restaurant-type urns. Although the device of the invention can be used to advantage with any finely divided coffee (i.e., coffee fine enough to pass through a 100-mesh screen), the coffee used is preferably ground to a degree of fineness comparable to that of wheat flour, hence the name, "coffee flour." Using coffee flour and the device of the invention, it is possible to increase the yield of brewed coffee by 25% to 50% or more without sacrificing quality. Thus, for example, whereas one pound of coffee will typically yield about 30 cups of brewed coffee per pound when made in the conventional urn, the same coffee may yield up to 45 cups or more per pound of identical quality if used in the form of coffee flour with the extractor of the invention. An important advantage of the invention is the fact that the increase in the yield of brewed coffee occurs without sacrificing quality. Thus, in the opinion of professional coffee tasters, the coffee made using the apparatus of the invention is comparable in quality to that made with the same coffee made in the usual manner, even though the yield is increased by up to 50% or more.

The device of the invention will be better understood from the following detailed description thereof taken in conjunction with the accompanying drawings, in which the same numbers are used to represent like items in the several views. In the drawings:

FIGURE 1 is a sectional view showing one embodiment of the extractor of the invention in place within a coffee urn;

FIGURE 2 is an enlarged view showing the outlet of the extractor of FIGURE 1;

Figure 3:
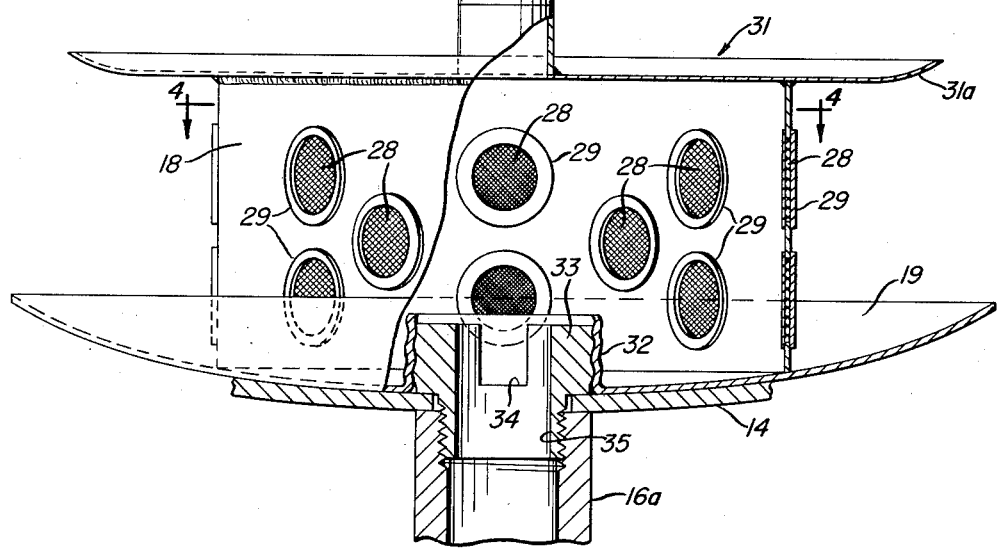
FIGURE 3 is a partial sectional view of another embodiment.

Referring to FIGURES 1 and 2, a typical coffee urn 10 which is used in conjunction with the apparatus of the invention comprises an outer container 11, typically of metal, enclosing insulating layer 12 and a liner 13 made usually of glass, stainless steel, china, or the like. Liner 13 is usually equipped with a more or less curved or sloping bottom 14 for facilitating complete emptying of the urn. In the middle of bottom 14 there is provided a coffee draw-off pipe leading to an external valve or spigot 25. The draw-off pipe 16 is connected by coupling 16a to an enlarged hollow nut 17, commonly known as a "frog" or "toadstool," which usually projects to some extent above the bottom 14 of the liner.

The embodiment of the invention shown in FIGURES 1 and 2 comprises a hollow body 18 to which there is affixed at its lower end a dished skirt 19 having a contour which closely follows the contour of the liner in the urn. Skirt 19 serves a dual function. It provides a convenient means for removing the grounds which settle out of the brewed coffee onto the skirt and which are easily removed when the assembly is taken out of the urn. In addition, by contacting or otherwise closely following the contour of the bottom of the liner in the urn, the skirt prevents the leakage of coffee grounds into the brewed coffee drawn from the urn. The skirt may be an integral part of the body or it may be made in detachable form (e.g., attached to body 18 with screws) so that any one of the number of skirts having different contours may be selected for use with a particular urn. Skirt 19 is provided with an inwardly extending depression 20 which provides clearance of the projecting toadstool 17. This clearance space allows the skirt to rest on the urn bottom 14 without interference, thus permitting a seal to be formed by the contacting surfaces.

Figure 5:
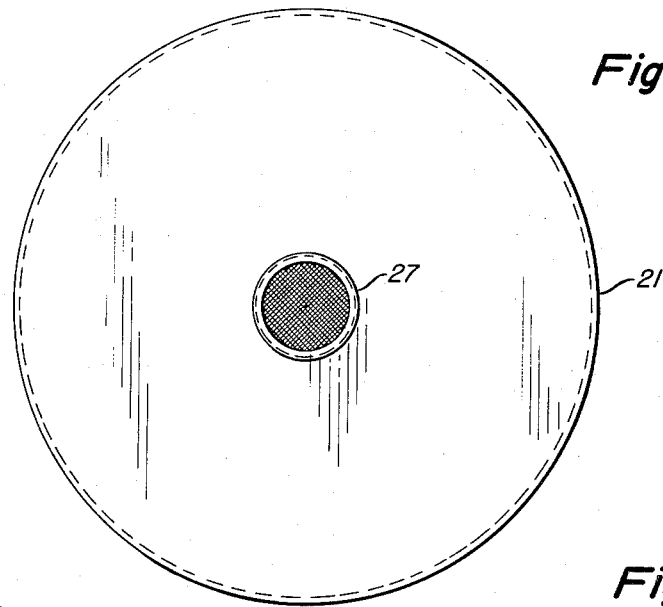
FIGURE 5 is a top view of the cover used in the embodiment of FIGURE 1.
Figure 4:
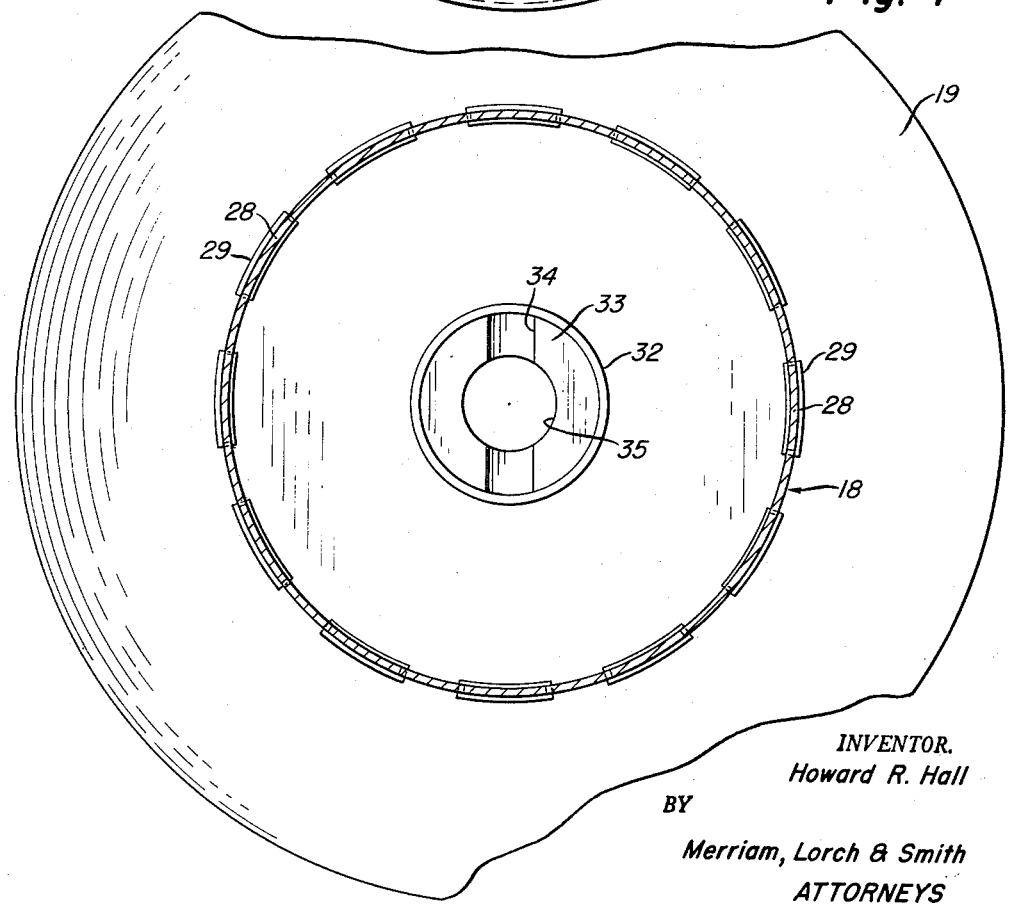
FIGURE 4 is a sectional view along the line 4—4 of FIGURE 3.

The body 18 is equipped with a top or cover 21 which in the embodiment shown is removable so as to provide access to the interior of body for cleaning. Cover 21 (also shown in FIGURE 5) is held in place by the engagement of pins 22 with suitable slots 23 cut within the rim of the cover. At the bottom of body 18 is discharge pipe 24 which fits within the hole of the toadstool 17 when the device is in use. Attached to cover 21 and communicating with the interior of the body is air vent pipe 26 which normally extends above the surface of the coffee. The air vent pipe is useful for preventing the entrapment of air within the body 18 which would tend to unseat the filter assembly and to permit the escape of coffee grounds into the brewed coffee. The air vent pipe is preferably capped with a fine mesh filter 27 to prevent the accidental introduction of grounds into the body.

Carried in the vertical wall of body 18 are a number of filter units 28 shown in detail in FIGURE 3 consisting of disks made of wire cloth having a suitably fine (e.g., 100) mesh. The number of these disks is not critical and depends on the size of the urn and the rate at which coffee is drawn. In a typical commercial unit, there may be used about 24 such disks, each with a diameter of about 1 inch. Each disk is held in place by a circular Z-clip 29 which grips the periphery of the disk and is pressed into position in a suitable opening in the wall of the body. This preferred method of fastening the filter units has been found to impart the strength and rigidity needed to withstand the rough handling the assembly is likely to encounter in commercial use. In addition, when made in this manner the device contains no hard-to-clean areas where coffee sediment or residue could accumulate over a period of time and thus impair the flavor of the brewed coffee.

There is shown in FIGURE 3 a preferred embodiment of the device of the invention. This embodiment closely resembles that shown in FIGURE 1 and is in fact identical except in the following particulars.

Top 31 is provided with an overhanging upper apron 31a which preferably has a slightly upturned rim. The apron provides an additional area for coffee grounds to settle on and thus avoid coming in contact with filters 28. Top 31 in this embodiment is firmly fixed, as by welding or soldering, to body 18 and is not meant to be removable.

The device of FIGURE 3 is attached to an urn with which it is to be used by means of a screwed connection. As shown, the bottom of the extractor is provided with an inwardly extending coarsely threaded socket 32, into which there is screwed a special toadstool 33 having matching threads and a longitudinally extending hole 35, which is permanently installed in the urn in the usual manner. Handle 36 is provided as an aid for screwing the extractor into engagement with the toadstool. By means of this type of connection a tight joint is formed and the possibility of a leak which would permit coffee grounds to find their way into the coffee discharge pipe 16 is practically eliminated.

The socket 32 is preferably relatively short so as to keep the amount of coffee which can't be drained out of the urn with the extractor in place to a minimum, and of a relatively large diameter in order to provide an opening into the body for cleaning, as by means of a brush. For facilitating the removal of liquid from the urn itself when the extractor is not in place, a groove or trough 34 is cut diagonally through toadstool 33 joining hole 35. Thus, with the extractor removed, liquid cannot accumulate in the urn to a depth higher than the bottom of the trough.

In brewing coffee with the device of the invention, the following procedure is recommended with the embodiment of FIGURE 1. With the extractor in place in the coffee urn, a portion (e.g., about a third) of the hot water needed to make the coffee is poured into the urn in the absence of any coffee. This water tends to seat the assembly in the urn, the contact of the dished skirt 19 with the bottom 14 of the urn serving as a seal to prevent the escape of any coffee grounds through the draw-off pipe and valve. If desired, suitable washers, made for example of rubber, may be used between the toadstool and the discharge pipe 24 to aid in forming a seal. The ground coffee is then added to the hot water in the urn, followed by the remaining hot water which serves to adequately mix the contents of the urn. No further stirring or mixing is required. With the device of FIGURE 3, no special procedure is required because of the positive seal which exists between the extractor and the urn. In either case, after a period of about 10–15 minutes in which the coffee is allowed to "knit" in the customary manner of using a coffee urn, the coffee is ready for serving.

When the coffee in the urn has been drained, it will be found that the coffee grounds have accumulated within the confines of the dished skirt, and on the cover and apron. The urn is thus easily cleaned by removing the filter assembly and with it most of the spent coffee grounds. The remaining grounds are easily washed out of the urn through the coffee discharge valve.

The foregoing detailed description has been given for clearness of understanding only, and no unnecessary limitations should be understood therefrom, as modifications will be obvious to those skilled in the art.

What is claimed is:

1. Coffee brewing apparatus for brewing coffee with finely divided coffee beans comprising in combination a coffee urn having an upwardly concave internal bottom surface and an extractor assembly in said coffee urn, said assembly comprising a closed hollow body portion having a peripheral wall, said body portion defining together with said urn an annular brewing zone in which brewed coffee solution is produced by the interaction of said coffee beans and hot water, an outwardly projecting upwardly concave dished skirt connected to and encircling said body portion at its lower end, said skirt contacting and having substantially the same contour as the internal bottom surface of said coffee urn, at least one filter element in the peripheral wall of said body portion, said filter element comprising a fine mesh wire screen covering an opening in said peripheral wall, said screen permitting the passage into said body portion of brewed coffee solution while blocking the passage therethrough of finely divided coffee beans, and discharge means for said coffee solution comprising a conduit connected to the lower end of said body portion and leading to a point outside said coffee urn and below said dished skirt.

2. The apparatus of claim 1 which is provided with an outwardly projecting apron encircling said body portion at its upper end and an air vent pipe one end of which is connected to said body portion and the other end of which is open to the atmosphere.

3. An extractor assembly for use in brewing coffee from finely divided coffee beans in a coffee urn having an upwardly concave internal bottom surface, said assembly comprising a closed hollow body portion having a peripheral wall, an outwardly projecting upwardly concave dished skirt connected to and encircling said body portion at its lower end, the height of said skirt being only a minor proportion of the height of said body portion, at least one filter element in the peripheral wall of said body portion, said filter element comprising a fine mesh wire screen covering an opening in said peripheral wall, said screen being adapted to block the passage into said body portion of finely divided coffee beans while permitting the passage therethrough of brewed coffee solution, and discharge means for coffee solution comprising a conduit connected to the lower end of said body portion and leading to a point below said dished skirt.

4. The extractor assembly of claim 3 which is provided with an outwardly projecting apron encircling said body portion at its upper end and an air vent pipe one end of which is connected to said body portion and the other end of which is open to the atmosphere.

References Cited in the file of this patent

UNITED STATES PATENTS

| | | |
|---|---|---|
| 2,021,293 | De Silva | Nov. 19, 1935 |
| 2,116,699 | Hall | May 10, 1938 |
| 2,139,881 | Comstock | Dec. 13, 1938 |
| 2,436,784 | Ballerino et al. | Mar. 2, 1948 |
| 2,715,386 | Jones | Aug. 16, 1955 |
| 2,780,162 | Chaplik | Feb. 5, 1957 |

FOREIGN PATENTS

| | | |
|---|---|---|
| 365,321 | Germany | Dec. 12, 1922 |
| 657,683 | Germany | Mar. 10, 1938 |